United States Patent [19]
Houk

[11] 3,747,879
[45] July 24, 1973

[54] ENGINE MOUNT
[75] Inventor: William A. Houk, Brighton, Mich.
[73] Assignee: General Motors Corporation, Detroit, Mich.
[22] Filed: Feb. 23, 1972
[21] Appl. No.: 228,560

[52] U.S. Cl. .................................. 248/9, 180/64 R
[51] Int. Cl. ............................................. F16m 5/00
[58] Field of Search ...................... 248/9, 10, 15, 5, 248/18; 180/64 R

[56] References Cited
UNITED STATES PATENTS
2,509,769   5/1950   Hirst ................................. 248/10 X
2,109,329   2/1938   Carleton ................................. 248/5
2,939,720   6/1960   Wroby ............................. 248/10 X
3,139,152   6/1964   Bajer ................................. 180/64 R
2,028,549   1/1936   Lord .............................. 248/18 UX FOREIGN PATENTS OR APPLICATIONS
573,682   3/1933   Germany ............................... 248/7

Primary Examiner—J. Franklin Foss
Attorney—J. L. Carpenter and R. L. Phillips

[57] ABSTRACT

An engine mount arrangement having a pair of engine mount assemblies each including a link that resiliently supports an engine at opposite sides on a vehicle frame so that the links do not swing substantially when the engine moves longitudinally or vertically relative to the frame and do swing substantially when the engine moves laterally or rolls relative to the frame. In each engine mount assembly the link is pivotally connected at its opposite ends by a pivot pin which is journaled in a bushing that is both radially and axially supported relative to the link by bodies of resilient material that are continuously loaded in compression.

2 Claims, 5 Drawing Figures

ENGINE MOUNT

This invention relates to an engine mount arrangement and more particularly to a linked bushing mount wherein two such mounts are used to resiliently support an engine for vertical, longitudinal and roll control of the engine relative to a frame.

Where an internal combustion engine powers a motor vehicle there are numerous vibrations that result such as vertical, longitudinal and roll vibrations. It is customary practice to isolate these engine vibrations from the passenger compartment by using resilient motor mounts and to a large extent the results of the rubber pad type currently in use have been very satisfactory. However, rubber pad type engine mounts while typically providing a low shear rate which is desirable for low engine speed vibration may also possess a compression-to-shear rate ratio that is difficult to raise to the high values desired for engine shake.

According to the present invention there is provided an engine mount arrangement comprising a pair of front engine mount assemblies each having a link resiliently pivotally connected at opposite ends to one side of the engine and the vehicle frame. The engine mount assemblies are arranged relative to the engine and the frame so that the links do not swing substantially when the engine moves vertically or longitudinally relative to the frame and do swing substantially when the engine rolls relative to the frame. Each pivot connection comprises a bushing in which is journaled a pivot pin that provides pivotal connection between the link and either the engine or frame with the bushing being prevented from moving with respect to the pin. Bodies of resilient material are continuously loaded in compression between the bushing and link with one body acting to resist radial movement of the bushing and two separate bodies resisting axial movement thereof whereby static and dynamic loads are primarily carried by the one body of resilient material in radial loading, torsional motions or roll of the engine cause rotational shear of all of the bodies of resilient material, and longitudinal motions of the engine cause coning strains to be imposed on all of the bodies of resilient material. Thus, the engine mount of the present invention provides a high compression rate for shake control and a low shear rate for low frequency control.

An object of the present invention is to provide a new and improved engine mount assembly for resiliently supporting an engine on a frame of a vehicle.

Another object is to provide in an engine mount arrangement a pair of engine mount assemblies each including a link for resiliently supporting an engine at opposite sides on a vehicle frame so that the links do not swing substantially when the engine moves either vertically or longitudinally relative to the frame and do swing substantially when the engine rolls relative to the frame with these pivotal connections being supported by resilient material continuously loaded in compression both radially and axially of the pivot axis to effect engine vibration isolation from the frame.

Another object is to provide in an engine mount assembly a link having a pair of resiliently supported bushings which are each supported for both axial and radial movement relative to the link by resilient bodies of material which are continuously loaded in compression to resist such movement.

Another object is to provide in an engine mount assembly a link having two pivotal connections with each pivotal connection supported relative to the link by resilient bodies of material which are continuously loaded to resist movement of the pivot in both its axial and radial directions.

Another object is to provide an engine mount assembly having a link and resiliently supported pivots resiliently pivotally connecting the link at spaced points to an engine and a frame with each pivotal connection being resiliently supported relative to the link by bodies of resilient material which are continuously loaded in compression to effect a high compression rate for engine shake control and a low shear rate for low speed engine vibration isolation.

These and other objects of the present invention will be more apparent from the following description and drawing in which.

Figure 1:
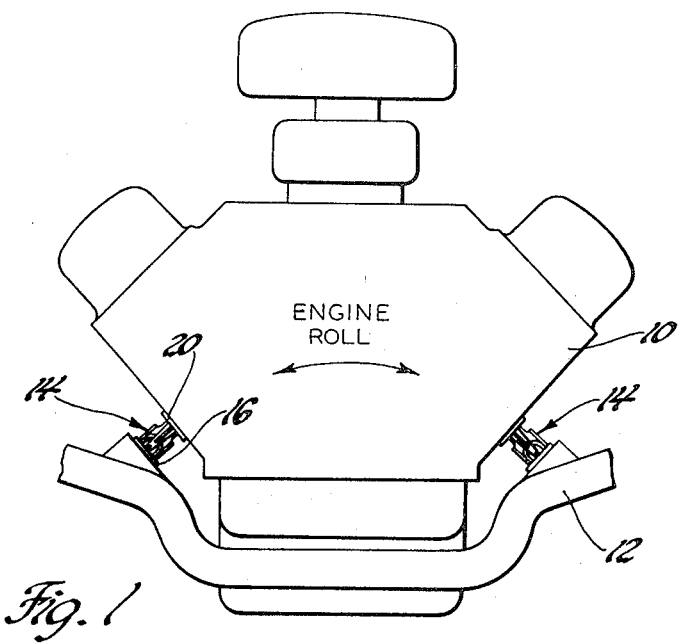
FIG. 1 is a front elevational view of an internal combustion engine resiliently supported on a frame of a vehicle by a front engine mount arrangement having engine mounts according to the present invention.

Referring now to the drawing and particularly to FIG. 1, there is shown an internal combustion engine 10 which is supported at its opposite sides on a vehicle frame 12 by a front engine mount arrangement comprising a pair of engine mount assemblies 14 according to the present invention. These two mounts 14 act as the two forward supports of an engine mounting system which may be of the three point type which has an additional centrally located rearward mount, not shown, whose attachment is between the transmission secured to the rear of the engine and a cross-member of the frame 12.

Figure 2:
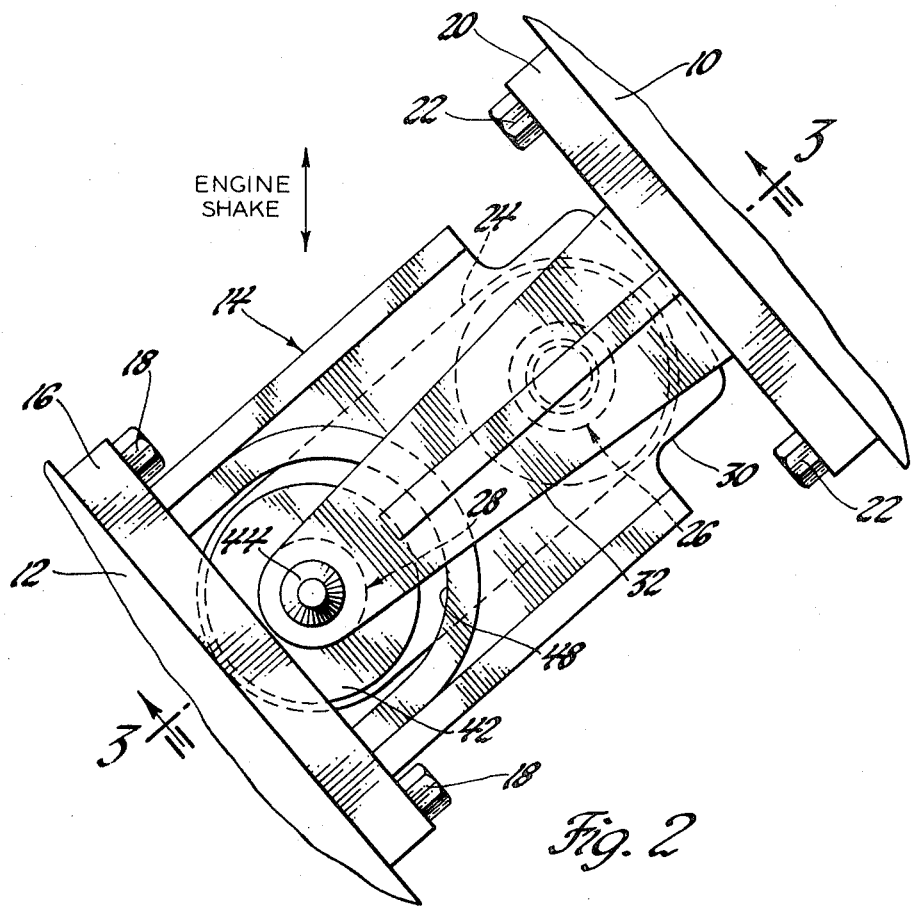
FIG. 2 is an enlarged view of one of the engine mounts of FIG. 1.
Figures 3, 4, 5:
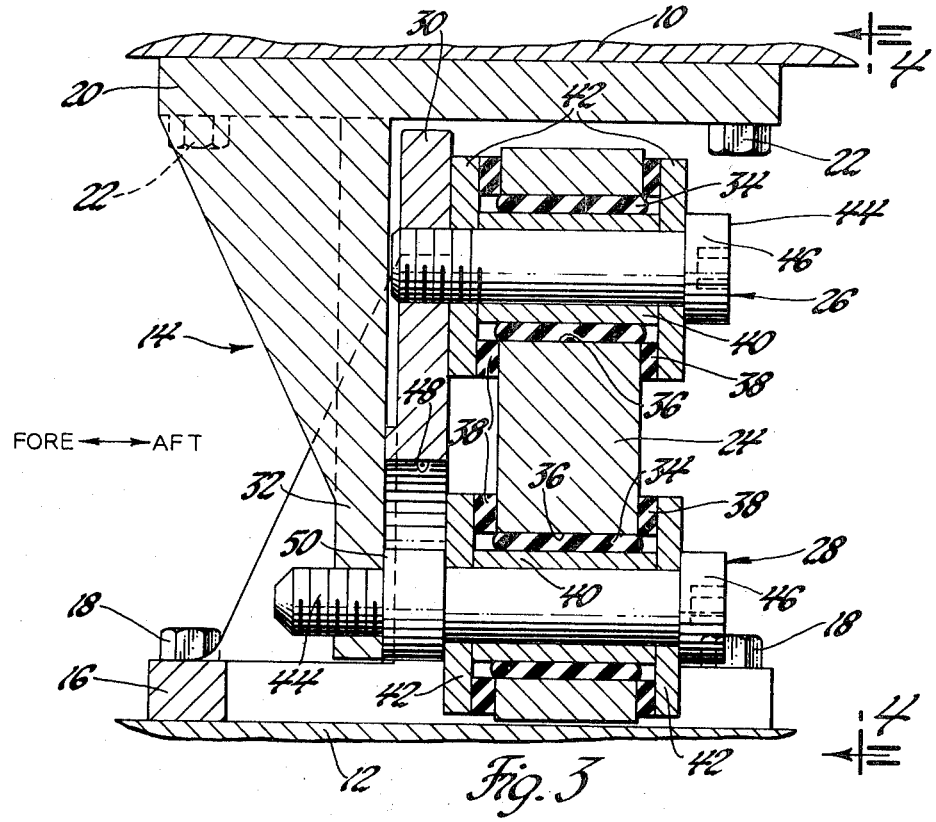
FIG. 3 is a view of the engine mount taken along the line 3—3 in FIG. 2.
FIG. 4 is a view of the engine mount taken along the line 4—4 in FIG. 3.
FIG. 5 is a partial view of the engine mount from FIG. 3 but when partially assembled.

Each of the front engine mount assemblies 14 as shown in FIGS. 2, 3 and 4, comprise a frame bracket 16 which is secured by bolts 18 to the frame 12 and an engine bracket 20 which is secured by bolts 22 to one side of the engine 10. A link 24 is pivotally connected by resiliently supported pivot assemblies 26 and 28 to arms 30 and 32 of the respective brackets 16 and 20, the frame arm 30 extending outward from the frame 12 toward the engine 10 with its pivot connection with the link 24 being close to the engine 10 and the engine bracket arm 32 extending outward from the engine toward the frame 12 with its pivotal connection with the link 24 being close to the frame 12.

Each of the resiliently supported pivot assemblies 26 and 28 comprises a cylindrically shaped body 34 of resilient material such as rubber bonded in a circular hole 36 in one end portion of link 24 and a pair of ring shaped bodies 38 also of resilient material such as rubber bonded to opposite sides of the link 24 about the hole 36. These three resilient bodies 34 and 38 when unloaded or in their free state have trapezoidally shaped cross sections as shown in FIG. 5 in the link-to-engine bracket pivot assembly 28 with their longest parallel side against the link. A bushing 40 is pressed into the resilient cylinder 34 having an outer radial dimension such that the resilient cylinder 34 is compressed a sufficient amount that static and dynamic loads plus the expected drift in the material will not unload this resilient body on one side of the bushing 40. The bushing 40 extends axially outward of the hole 36 past the opposite sides of the link 24 and beyond the resilient rings 38 when they are in the free state. A pair of washers 42 are located opposite the ends of the bushing 40 and a bolt 44 is passed through the washers 42 and the intermediately located bushing 40. As viewed in FIG. 3, the bolt head 46 engages the right-hand washer 42 and is at its left-hand end threadably secured to the remote end of the associated bracket arm. On torquing the bolt 44 the resilient rings 38 are compressed with such compression being limited by the washers 42 engaging the ends of the bushing 40. The axial dimension of the bushing 40 is determined so that compression of the resilient rings 38 between the washers 42 and the link 24 is maintained during fore and aft or longitudinal movements of the engine relative to the frame. As best shown in FIG. 3, in the connection of the pivot assembly 28 to the engine bracket arm 32, the frame bracket arm 30 is provided near its base with an opening 48 through which link-to-engine bracket bolt 44 extends to make connection with the remote end of the engine bracket arm 32, there in this instance being provided a spacer 50 between the bracket and the left-hand washer to accommodate for the thickness of the frame bracket arm 30.

In the engine mount arrangement the engine mount assemblies 14 are arranged relative to the engine 10 and frame 12 so that the engine mount links 24 do not swing substantially when the engine moves either vertically or longitudinally relative to the frame and do swing substantially when the engine rolls relative to the frame. Vertical movement or engine shake is indicated by the arrows in FIG. 2, longitudinal or fore and aft engine movement is indicated by the arrows in FIG. 3 and engine roll is indicated by the arrows in FIG. 1. Thus, the major portion of static and dynamic loads are carried by the resilient cylinders 34 in radial loading with the remaining small amount being carried by the resilient rings 38 in shear. On the other hand, torsional or roll motions of the engine cause rotational shear of both the resilient cylinders 34 and resilient rings 38. Longitudinal or fore and aft motions of the engine relative to the frame cause coning strains to be imposed on both the resilient cylinders 34 and resilient rings 38.

Thus, in the engine mount according to the present invention, the compression rate is determined mainly by the radial rates of the two resilient cylinders 34 whereas the torsional or roll rates are determined by the torsional rates of the resilient cylinders 34 and the resilient rings 38 plus the lever effect of the center distance between the pivot connections. The subject link engine mount as a result provides substantially higher compression-to-shear rate ratios than can be obtained with conventional rubber pad mounts which usually provide ratios of 5:1 or 6:1 and with shear plates added, rate ratios of 10:1 or 11:1. For example, I have found that with engine mount assemblies like those shown there can be provided compression-to-shear rate ratios from 8:1 to as high as 38:1 and fore and aft-to-shear rate ratios from 1:1 to as high as 8:1. Thus the engine mount assembly according to the present invention provides a high compression rate which is desirable for shake control and a low shear rate which is desirable for low engine speed or frequency control.

The above described embodiment is illustrative of the invention which may be modified within the scope of the appended claims.

I claim:

1. In an engine mount arrangement, an engine, a frame, a pair of engine mount assemblies resiliently supporting said engine at opposite sides of said frame, each said engine mount assembly including an engine bracket secured to one side of said engine, a frame bracket secured to said frame opposite said engine bracket, said engine bracket having an arm extending from said engine toward said frame, said frame bracket having an arm extending from said frame beside said engine bracket arm toward said engine, a link and a pair of pivot means resiliently pivotally connecting said link at opposite ends to said bracket arms with the pivot connection to said engine bracket arm located closer to said frame than to said engine and the pivot connection to said frame bracket arm located closer to said engine than to said frame and above the other pivot connection, said engine mount assemblies arranged relative to said engine and said frame so that said links do not swing substantially when said engine moves either vertically or longitudinally relative to said frame and do swing substantially when said engine rolls relative to said frame, each said pivot means comprising a bushing located in an opening through the associated link, resilient means mounted in said opening between said bushing and the associated link and loaded in compression by said bushing during all said engine movements, compression loading means at opposite ends of and fixed for movement with said bushing, separate resilient means mounted on opposite sides of the associated link between the link and said compression loading means and continuously loading by said compression loading means during all said engine movements, a pivot pin journaled in said bushing for providing the pivotal connection.

2. In an engine mount arrangement, an engine, a frame, a pair of engine mount assemblies resiliently supporting said engine at opposite sides on said frame, each said engine mount assembly including an engine bracket secured to one side of said engine, a frame bracket secured to said frame opposite said engine bracket, said engine bracket having an arm extending from said engine toward said frame, said frame bracket having an arm extending from said frame beside said engine bracket arm toward said engine, a link and a pair of pivot means resiliently pivotally connecting said link at opposite ends to said bracket arms with the pivot connection to said engine bracket arm located closer to said frame than to said engine and the pivot connection to said frame bracket arm located closer to said engine than to said frame and above the other pivot connection, said engine mount assemblies arranged relative to said engine and said frame so that said links do not swing substantially when said engine moves either vertically or longitudinally relative to said frame and do swing substantially when said engine rolls relative to said frame, each said pivot means comprising a bushing located in an opening through the associated link, a resilient cylinder mounted in said opening between said bushing and the associated link and loaded in compression by said bushing, washers at opposite ends of said bushing, resilient rings mounted on opposite sides of the associated link between the link and said washers, a bolt journaled in said bushing and extending through said washers and said resilient rings for providing the pivotal connection and also forcing said washers to engage the opposite ends of said bushing and load said resilient rings in compression.

* * * * *